United States Patent [19]

Johnson

[11] Patent Number: 4,859,332
[45] Date of Patent: Aug. 22, 1989

[54] FILTER LEAF CLEANING JET APPARATUS

[76] Inventor: Willard L. Johnson, 12923 Lincoln Ave., Huntington Woods, Mich. 48070

[21] Appl. No.: 120,581

[22] Filed: Nov. 19, 1987

Related U.S. Application Data

[63] Continuation-in-part of Ser. No. 24,383, Mar. 19, 1987, abandoned, which is a continuation-in-part of Ser. No. 932,010, Nov. 26, 1986.

[51] Int. Cl.$^4$ ............................................. B01D 29/38
[52] U.S. Cl. ................................... 210/332; 210/340; 210/346; 210/486
[58] Field of Search ........................ 210/322, 323.1, 332, 210/333.01, 335, 339, 340, 341, 346, 347, 486, 488; 55/159, 171, 240, 259, 307, 482, 484

[56] References Cited

U.S. PATENT DOCUMENTS

| | | | |
|---|---|---|---|
| 2,013,776 | 9/1935 | Wiesman | 210/182 |
| 2,061,351 | 11/1936 | Denhard | 210/195 |
| 2,104,473 | 1/1938 | Watson | 210/195 |
| 2,551,312 | 5/1951 | Bokich | 210/190 |
| 2,552,305 | 5/1951 | Benedict | 210/181 |
| 2,555,724 | 6/1951 | Woody et al. | 210/181 |
| 2,691,445 | 10/1954 | Eickemeyer | 210/195 |
| 2,821,305 | 1/1958 | Anderson | 210/455 |
| 3,056,504 | 10/1962 | Lavallee | 210/328 |
| 3,339,742 | 9/1967 | Kracklauer | 210/232 |
| 3,559,809 | 2/1971 | Barmore | 210/333 |
| 3,623,614 | 11/1971 | Schmidt, Jr. | 210/486 |
| 3,635,343 | 1/1972 | Holland | 210/104 |
| 3,959,148 | 5/1976 | Krynshi et al. | 210/347 |
| 4,116,838 | 9/1978 | Lazzaratta | 210/346 |
| 4,519,903 | 5/1985 | Johnson | 210/234 |
| 4,579,656 | 4/1986 | Johnson | 210/234 |

FOREIGN PATENT DOCUMENTS

| | | |
|---|---|---|
| 475091 | 11/1937 | United Kingdom . |
| 1032123 | 6/1961 | United Kingdom . |
| 1058349 | 2/1967 | United Kingdom . |
| 1227628 | 4/1971 | United Kingdom . |
| 1279606 | 6/1972 | United Kingdom . |
| 1366153 | 9/1974 | United Kingdom . |
| 2094653 | 9/1982 | United Kingdom . |

Primary Examiner—Peter Hruskoci
Assistant Examiner—Wanda L. Millard
Attorney, Agent, or Firm—Basile and Hanlon

[57] ABSTRACT

A filter leaf cleaning system for use in a suction-type filter apparatus having a tank to receive polluted liquids to be filtered or clarified includes a cleaning system header connected to a filtrate discharge conduit for diverting a portion of filtrate flow into the cleaning system, valve means connected to the cleaning system header for controlling filtrate flow into the cleaning system, a dispersing conduit connected to the cleaning system header adjacent a particulate-filtering surface of each filter leaf and having an opening for directing the filtrate flow across the particulate-filtering surface to flush particulates from the surface toward a solids collecting section of the tank housing the filter leaf. In addition, or in the alternative, the cleaning system may employ a membrane wiping member for sweeping movement across the particulate-filtering surface to brush residue or particulates from the surface. The wiping member is supported for oscillating movement along a path generally parallel to the membrane surface.

23 Claims, 5 Drawing Sheets

FILTER LEAF CLEANING JET APPARATUS

This application is a continuation-in-part of Application Serial No. 07/024,383 filed March 19, 1987, now abandoned which was a continuation-in-part of Application Serial NO. 06/932,010 filed Nov. 26, 1986, which is still pending.

BACKGROUND OF THE INVENTION

I. Field of the Invention

The invention relates to solid particulate separation from liquids by vacuum filtering and, more particularly, to a filter leaf cross-flow membrane cleaning jet apparatus used in conjunction with a leaf-type liquid filter machine capable of clarifying and separating an exceptionally large volume of liquid.

II. Description of the Prior Art

Various types of leaf-type filtering apparatuses are known. For example, my U.S. Pat. Nos. 4,519,903 and 4,579,656 disclose a compact apparatus for filtering large volumes of liquid to remove contaminant particles from the liquids. Many of the known leaf-type filter machines have short operating cycles due to the solid particulates collecting on the filter medium, clogging the openings, which results in the rapid build-up of a cake on the filter and correspondingly reduces the amount of filtrate flow. Tremendous amounts of time are consumed in shutting down the filter machines and cleaning the cake from the filters.

This application discloses the construction of a filter leaf cross-flow membrane cleaning jet apparatus, which uses a large portion of the clarified filtrate, which is pumped vertically downward across the face of the filter leaf membrane, to push particulates about the face of the filter leaf downwardly towards a collection tank portion, thereby continuously offering a fresh surface on the filter medium which correspondingly increases the effective operating cycle of the filter machine. Other advantages of this invention include the easy removal of the conduit with the attached filter leaves as a single assembly from the filter tank and provides the capability for separate, independent sets of filters with different filtering characteristics to produce different filtrate streams from within the same tank enclosure. Additionally, the invention provides the capability for backwashing a portion of the filter panels while the remaining portion of filter panels continues to operate. Furthermore, the invention provides for wiping the surface of the filter membrane to further increase the effective operating cycle of the filter machine.

SUMMARY OF THE INVENTION

The invention disclosed herein relates to a filter machine in which the effluent to be filtered over flows into the tank of the machine from above the filter leaves or units so that there is always a downward flow of polluted liquid and its contained solids from the input opening to the solids discharge portion of the machine. The filtrate is obtained by means of a suction pump communicating with the filter leaves.

Another purpose and function of the instant invention is to continuously filter a very large volume of polluted immiscible liquids and simultaneously separate the solids therefrom for discharge to the settling tank portion of the machine and simultaneously separate the water from the oil. The suction pump is normally continuously in operation, supplying vacuum on the clean side of the filter and pressure to the filtrate while a portion of the filtrate flow is diverted through the jet apparatus (debris is not pumped through the filter membrane). The relatively close spacing between and the side-by-side proximity of the filter leafs one with another is very important, and this dimension is governed by the diameter of the outlet tube or conduit mounted on and at one end of the filter core panel. The relatively thin, vertical end edge of one leaf is engaged between the outlet tubes of the two adjacent leafs. The filter leaf cross-flow cleaning jet apparatus includes a dispersing conduit receiving an ample portion of the filtered liquid. The dispersing conduit is positioned adjacent and immediately above the spacing between the side-by-side filter units. The discharge conduits include jet openings spaced along the length of the dispersing conduit to direct pressurized filtrate downwardly between and across a face of the filter media. The downward flow of filtrate from the jet openings pushes or urges the solid particulates to move downwardly across the filter membrane towards the solids discharge portion of the filter tank, while at the same time the water or oil can flow freely through the membrane. The flow of liquid below the filter units is kept to a minimum, allowing the solid particulates to readily settle, for removal through the bottom drain of the filter tank.

The filter machine, in one form, is made of an acrylic, clear, transparent, plastic material. The machine can also be made of PVC, fiberglass or one or more of the polystyrenes or polyethylenes or their equivalents or stainless steel, depending on the particular application in which the filter machine is to be used. The plastic leaf core panels are of a unique design, permitting substantial flow of filtered liquid in vertical, horizontal and transverse directions through both sides of the core panel, to a discharge conduit at one end thereof. The filter leaf core panels are of very light weight and the filter-leaves-conduit assembly can be easily removed from the machine by lifting up from their positions of rest inside the filter tank. Wiping members may be supported from the dispersing conduits to sway back and forth across the membrane surface, softly brushing particulates from the surface.

BRIEF DESCRIPTION OF THE DRAWINGS

These and other objects, features and advantages of the invention will become more apparent by reference to the following detailed specification to be read in context with the attendant drawings, in which.

DESCRIPTION OF THE PREFERRED EMBODIMENTS

Figure 1:
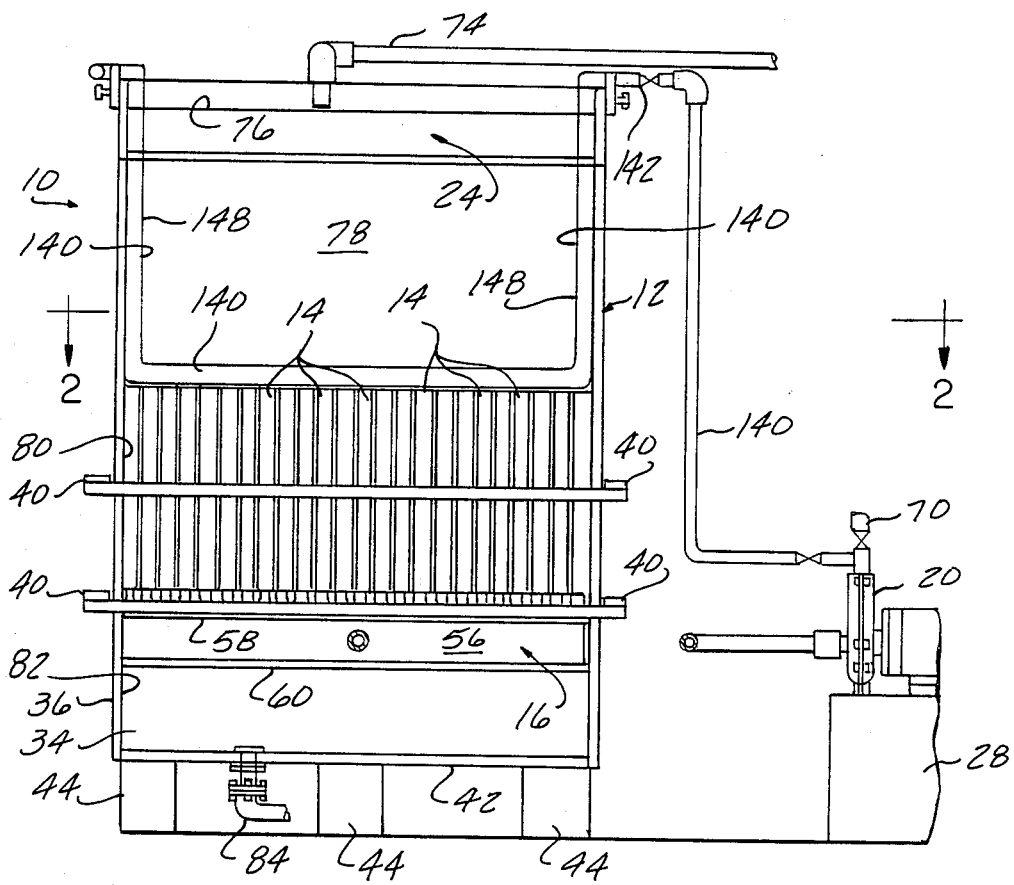
FIG. 1 is a side elevational view of a filter machine embodying the invention.
Figure 2:
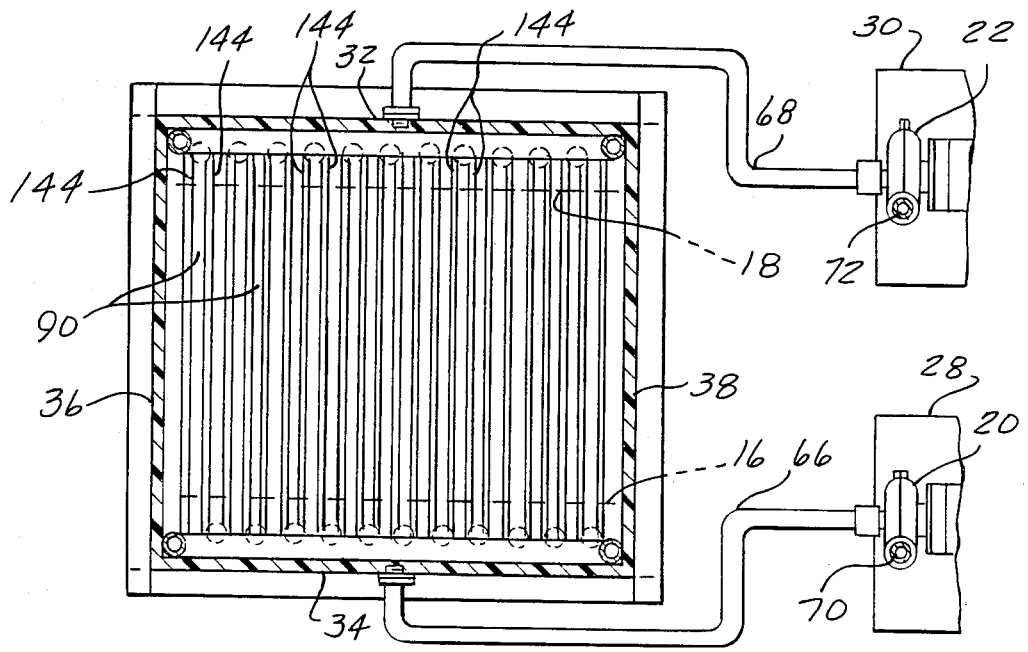
FIG. 2 is a horizontal section view taken substantially on the line 2—2 shown in FIG. 1, looking in the direction of the arrows.
Figure 3:
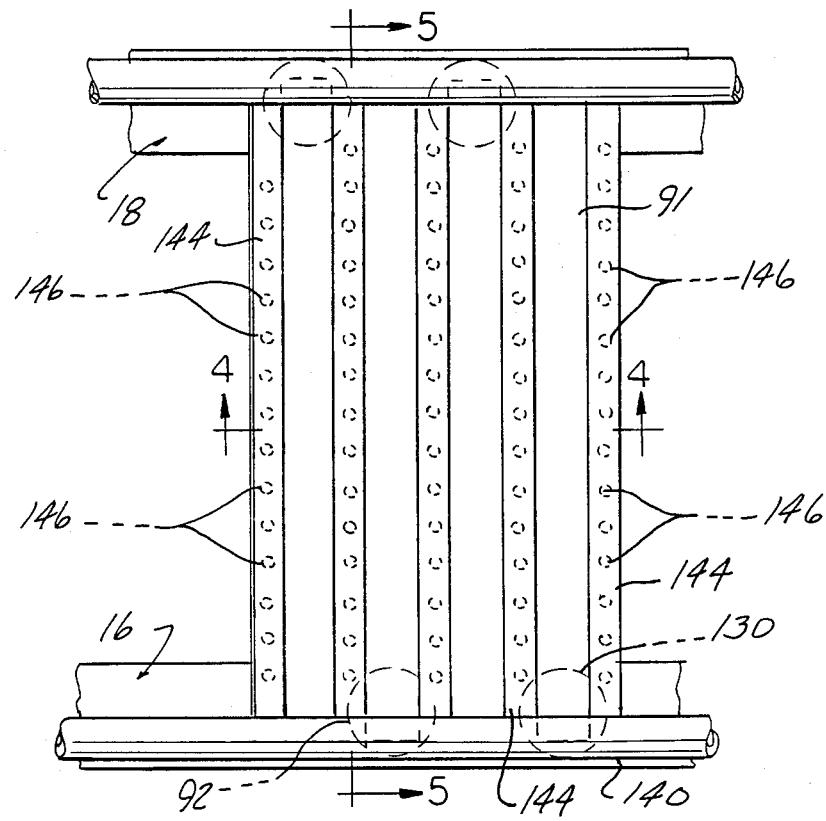
FIG. 3 is an enlarged view of the horizontal section shown in FIG. 2.
Figure 4:
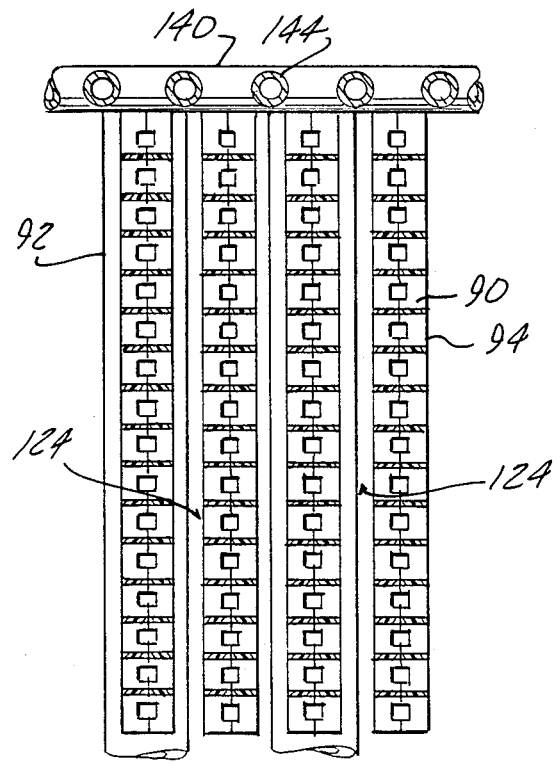
FIG. 4 is a sectional side elevational view taken substantially on the line 4—4 as shown in FIG. 3.

In a preferred embodiment of the invention, the filter apparatus 10 includes a tank 12, filter leaves 14, manifolds 16 and 18 for the filter leaves, motor-driven suction pumps 20 and 22, polluted liquid input trough 24, and a liquid overflow discharge trough (not shown). Support pads 28 and 30 are provided for the motor-driven suction pumps 20 and 22. An auxiliary or supplementary tank (not shown) can associatedly be connected and communicate with the filter tank to receive a portion of clean effluent and furnish a supply of liquid to flush any material floating on the surface of the input supply into the overflow discharge trough.

The tank 12 includes lateral side walls 32 and 34, rear and front end walls 36 and 38 respectively, wall reinforcing bars 40 secured to the side and end walls and, at their ends, to each other, a bottom plate 42, transverse tank support bars 44, the polluted liquid input trough 24 including an associated liquid distributing plate, and the overflow discharge trough or chamber.

The lateral manifolds 16 and 18 can be in the form of rectangular, cross-sectional tubes, each manifold including lateral side walls 56, a top wall 58 and a bottom wall 60, all connected together at their contiguous edge portions to form a liquid-tight fluid passegeway. The removable manifolds 16 and 18 preferably formed into substantially rectilinear tubes closed at the rearward and forward ends, respectively. The manifolds 16 and 18 provide support for the filter units 14, as will be described in greater detail below. Conduits 66 and 68 are threadingly connected to the tank side walls 32 and 34 and communicate with the manifolds 16 and 18 respectively. The conduits 66 and 68 are connected at their opposite ends to the input port of the suction pumps 20 and 22 respectively.

Output conduits 70 and 72 are connected to and communicating with the output or discharge port of the pumps 20 and 22 respectively. The output conduits 70 and 72 can be connected to additional piping or conduit for any desirable use of the filtrate developed and discharged by the pumps 20 and 22. As described hereinafter below, numerous advantages can be achieved when the filtrate is recirculated back to conduits 140 in the tank 12 to continuously flush or clean solid particulates from the particulate-filtering surface of each filter.

Polluted input liquids, including immiscible fluids, to be filtered by the filter units 14 are provided by any suitable device or system, such as a pump (not shown) or immersion (not shown). The polluted input liquids can be drawn from any source and, if pumped, are discharged through conduit 74 into the tank input trough 24 from which it flows over the input weir 76 onto the liquid distributing plate (not shown) into the upper tank chambers 78 above the filter units 14. If immersed, as in a lagoon, polluted input liquids overflow into the tank. The tank 12 can be immersed in a lagoon by supporting it from a pontoon platform at a fixed level below the fluid line of the lagoon, such that fluid will flow by gravity into the open section of the tank 12.

The intermediate tank portion 80 is in direct and full communication with the upper tank chamber 78. The intermediate tank portion 80 contains the filter units 14 and the manifolds 16 and 18. A lower tank portion 82 is in direct and full communication with the intermediate tank portion 80. The lower tank portion 82 is provided under the manifolds and filter leaves 14 for collection of solid particles that pass downwardly between the filter units 14 or that fall from the filter media covering them onto the tank bottom wall 42, for discharge through the drain outlet 84. The lower tank portion 82 can have a sloped, downwardly converging bottom, with the drain outlet 84 located at the lowermost position of the bottom.

Figure 5:
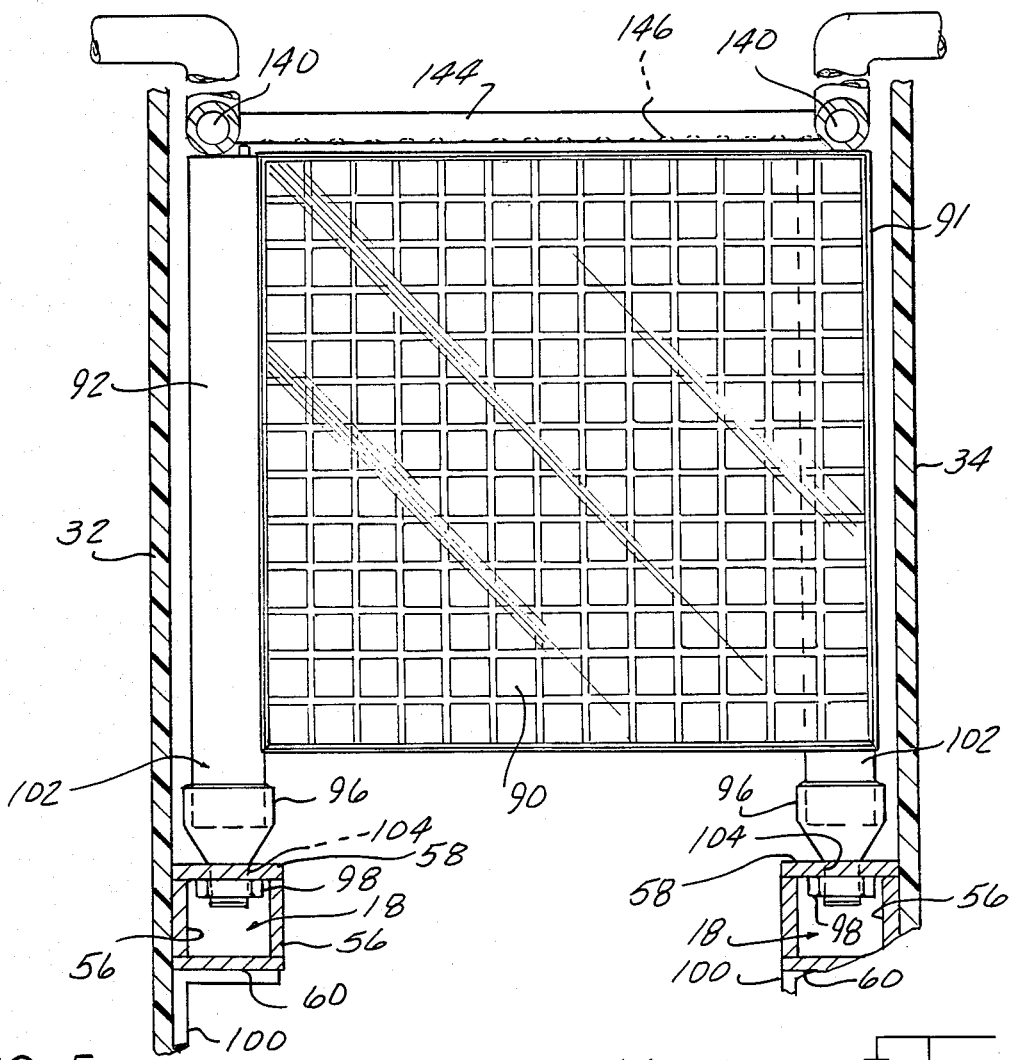
FIG. 5 is a sectional end elevational view taken substantially on the line 5—5 as shown in FIG. 3.
Figure 6:
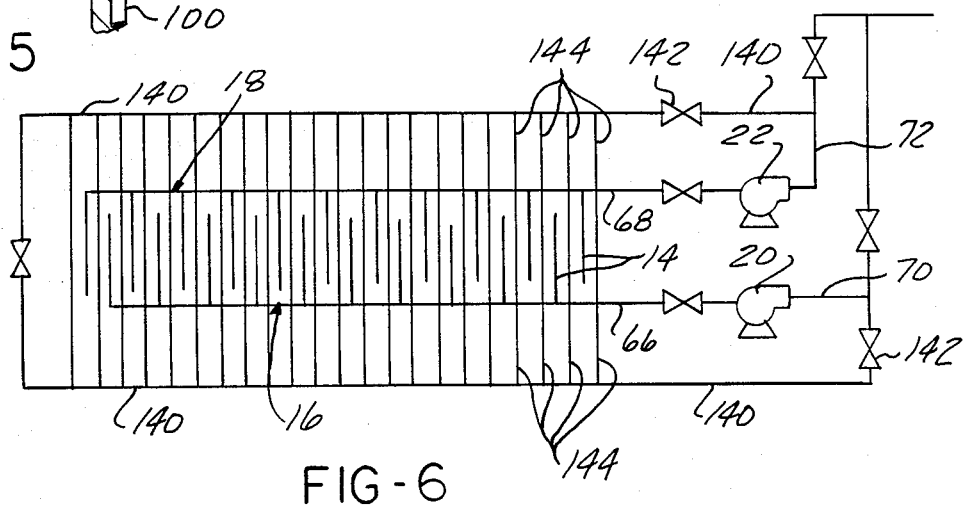
FIG. 6 is a schematic view of the associated piping for the filter leaf cross-flow cleaning jet apparatus.
Figure 10:
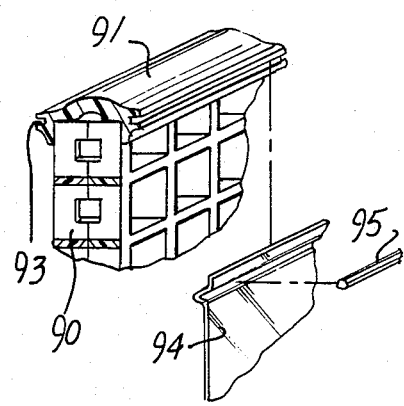
FIG. 10 is an exploded detail of the means for attaching the membrane to the filter core panel.
Figure 7:
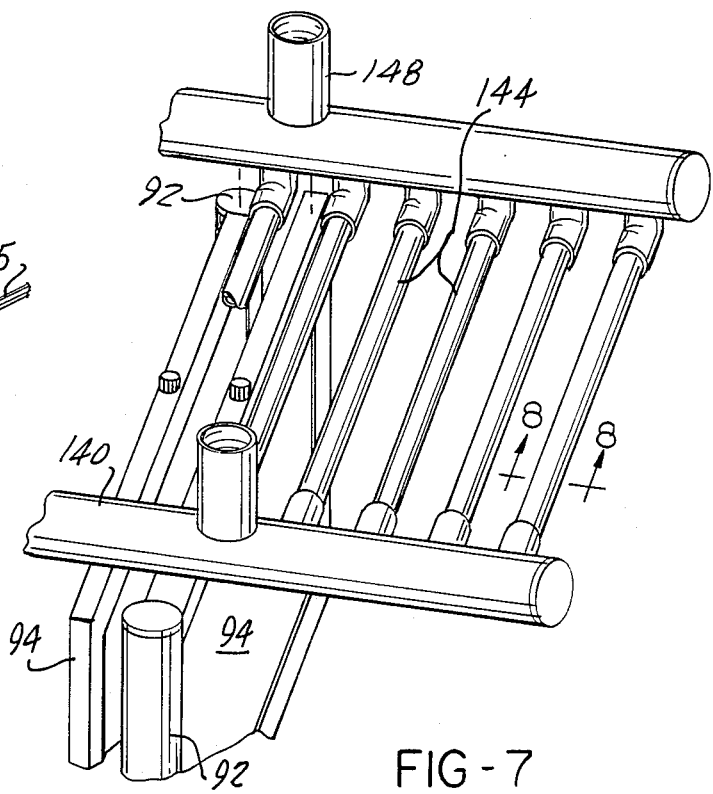
FIG. 7 is a perspective view of the filter leaf cross-flow cleaning jet apparatus.
Figure 8:
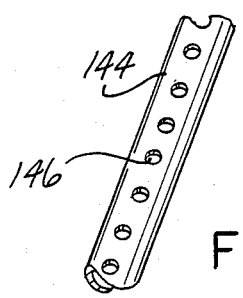
FIG. 8 is a bottom view of a dispersing conduit taken on the line 8—8 as shown in FIG. 7.

Each filter unit 14 includes a core panel 90, a conduit 92 secured to and overlying a vertical edged portion of the core panel, and a filter medium material, such as membrane 94. The lower end portion 102 of conduit 92 fits within an enlarged portion of pipe 96 and adhesively sealed in place around the joint 97. Pipe 96 has a threaded, reduced portion which is threadingly engaged to secure and seal the pipe 96 through a close fitting opening 104 in the top wall 58 of the manifold 16 or 18. The threading engagement can be accomplished by securing a nut 98 to the top wall 58 of manifold 16 or 18 as shown in FIG. 5. The manifold 16, 18, and conduits 92, filter core panels 90, and membranes 94 can be lifted as one assembly off a lower support 100 connected to the tank 12. The filter units 14 are arranged in staggered, adjacent, abutting, lateral relationship, leaving a narrow passage 124 between them. Of course, as the outside diameter of conduit 92 increases, the passageway between adjacent, medium-covered cores also increases. The conduit 92 is provided with a slot 130 extending from one end over the height dimension of the core panel 90, the lower remaining end portion 102 of the conduit 92 being unslotted. The filtration medium 94 can be installed with a gasket 95 by compressing the edge of the medium 94 and gasket 95 into a peripheral slot 93 formed on a plastic edge extrusion 91 which is adhesively secured to the filter core 90, as shown in FIG. 10; or other means, such as those disclosed in my copending applications Serial No. 06/932,010 and Serial No. 07/024,383, could be used.

In order to maintain the integrity of the system, adhesive is used for holding and sealing the filter units 14 in place on the manifolds 16 or 18, as shown in FIG. 5 at joint 97. In addition, it has been found that when using a submicron filtering medium or membrane 94, it is preferable to provide means for bleeding air from within the filter units 14, since it is preferable to prime the filter units 14 with fluid filtrate, such as clean water or oil, while priming the suction inlet conduit of the associated motordriven suction pump. This priming of the filter units 14 with fluid filtrate, such as clean water or oil, provides fluid from the filter unit 14 to the inlet of the suction pump, such that filtration of liquid in tank 12 begins immediately on start-up of the suction pump and reduces the bouyancy of the filter units 14. The air bleeding means can include a small diameter pipe or plastic tube 150 disposed on an upper portion of each filter unit 14 and a threaded cap 152 to seal the opening, or other air bleeding device well known to those skilled in the art.

The continuous filter leaf-flow cleaning jet apparatus includes a cleaning system header 140 connected to the filtrate output conduit 70 and/or 72 for diverting a portion of filtrate flow into the cleaning system, valve means 142 connected to the cleaning system header 140 for controlling filtrate flow into the cleaning system header, a filtrate dispersing conduit 144 connected to the cleaning system header 140 adjacent a particulate-filtering membrane surface 94 of each filter leaf 14, wherein an opening 146 in the dispersing conduit 144 directs the filtrate flow vertically downward across the particulate-filtering membrane surface 94 to flush particulates across the surface toward the solids collecting section 82 of the tank 12.

As shown in FIGS. 3 through 10, preferably at least two cleaning system headers 140 are provided. One cleaning system header 140 is positioned above each manifold 16 and 18 having a riser portion 148 releasably secured to the tank 12. Quick release is provided in the cleaning system headers 140 to facilitate removal of the continuous filter leaf cleaning system from the tank 12 in the event maintenance must be performed on the filter leaves 14.

Preferably a plurality of dispersing conduits 144 extend between the cleaning system headers 140. The filtrate dispersing conduits 144 are disposed spaced vertically above and aligned with the narrow passage 124 between adjacent filter leaves 14. Preferably, the dispersing conduit 144 extends along an entire length of a filter leaf 14 and connects into a fluid communication with each cleaning system header 140. The dispensing conduit 144 preferably includes a plurality of jet openings 146 longitudinally spaced along the bottom length of the dispensing conduit 144. Preferably, means are provided for aligning the dispersing conduit 144 vertically spaced above and horizontally in between the particulate-filtering surfaces of adjacent filter leaves 14, such as locating pins 160 shown in FIG. 9 which center the dispersing conduit 144 above the narrow passage 124 between adjacent filter units 14.

It has been found that a satisfactory filtrate flow across the particulate-filtering surface of the filter leaf 14 can be obtained by providing one-sixteenth inch diameter cleaning jet openings 146 spaced on one-half inch intervals from center to center along the longitudinal length of the dispersing conduit 144. In addition, it has been found to be beneficial to alternate the angle of discharge of the jet openings slightly from a direct vertical discharge, such that the jets discharge at an angle from the bottom of the dispersing conduit. The angle can be selected as apporximately 6° from vertical, for example, so that one jet discharges at 6° in one direction and an adjacent jet discharges 6° in the opposite direction from vertical. However, it should be recognized that these particular dimensions may be modified within the scope of the invention depending on factors, such as the filter medium 94 used in the particular filtration application presented, the dimension of the narrow passageway 124, and the percentage of filtrate flow diverted into the cleaning system header 140. It has also been found that satisfactory, continuous filter leaf cleaning is achieved by adequate filtrate flow diverted into the cleaning system header 140 and the associated dispersing conduits 144.

Prior to operating the filtration leaf apparatus, the appropriate filtration medium 94 is selected in view of the particular polluted liquid or immiscible fluid to be filtered and the degree of filtration required. A filtration medium, such as PTFE, may be chosen with openings or pores in the submicron range, such as a range selected from 0.2 microns to 0.8 microns. The size of the openings or pores is chosen to be smaller than the smallest particulate to be filtered by the filter leaves 14. Selecting a membrane 94 having openings in the submicron range, such as from 0.2 microns to 0.8 microns, prevents the particulates from entering the openings, which would lead to clogging of the openings; instead, the particulates to be filtered are forced downward off the outer surface of the membrane and can readily slide downward across the surface of the membrane due to the forces of gravity and the cleaning action of the cross flow directed across the outer surface of the filtration membrane 94. While the size of the openings in the membrane 94 are kept very small, the filter surface area is correspondingly very large in the filter machine of the present invention. The large filter surface area avoids the build-up of a strong vacuum that would draw the particulates into the membrane openings. It has been found that with adequate filter area to operate the pumps with approximately two inches Hg (mercury) of vacuum, the particulates are allowed to continue downward beyond the lowermost portion of the filter leaves without being drawn into the openings of the membrane. In addition, it has been found that a membrane, such as Gelman Sciences Versapor microporous membrane, having 0.8 micron openings will flow in excess of 30 gallons per minute per square foot of filter surface area. In practice, by pump size, the present invention only uses about ten percent of the porosity available to draw filtrate, and of this filtrate quantity a large portion is recirculated through the crossflow cleaning jets to push or slide the particulate across the filtrate membrane surface toward the lower portion of the tank, thereby continuously offering a fresh membrane surface on the filter medium which correspondingly increases the effective operating cycle of the filter machine. In other words, the excess porosity or number of openings in the membrane surface reduces the horizontal velocity of the fluid drawn toward and through the filter membrane surface, thereby allowing the downward velocity of the particulate, due to gravity and the downward velocity from the cleaning jet openings, to be greater than the horizontal velocity which allows the particulate to pass downward through the narrow passage 124 between adjacent filter leaves 14 while merely touching or sliding along the surface of the membrane 94.

The selected filtration medium 94 is installed on the filter core 90 and secured in place as shown in FIG. 10. The filtration medium 94 can be installed on the filter core 90 by placing the medium 94 on top of the core panel 90 and pushing a gasket 95 against the medium 94, forcing the medium 94 and gasket 95 into a peripheral slot 93 formed in the extrusion 91 that is adhesively secured to each edges of the core panel 90. The extrusion 91 secured to the edge enclosed in the conduit 92 has openings allowing fluid to flow into the conduit 92 from the core panel 90. This method and other methods of securing the membrane 94 to the core panel 90 are disclosed and described in my copending patent applications Serial No. 06/932,010 filed Nov. 26, 1986 and Serial No. 07/024,383 filed Mar. 19, 1987 which are incorporated herein by reference. The membrane 94 can be secured to the core panel 90 without the use of adhesives, screws or sewing to provide a leak-proof, semi-permanent assembly which can be easily assembled or disassembled without special tools. Each filter unit 14 is then lowered into place by passing the lower end portion 102 of the vertical conduit 92 through the close-fitting opening at 97 of pipe coupling 96 in the top wall 58 of the appropriate manifold 16 or 18 and is adhesively sealed to prevent leakage and maintain the integrity of the system. The continuous filter leaf cleaning jet system is then installed above the staggered, adjacent, abutting, lateral filter units 14. The filtrate dispensing conduits 144 are aligned and vertically spaced above the narrow passage 124 between adjacent filter leaves 14. The riser portion 148 of the cleaning system header 140 is releasably secured in place to the tank 12. The tank and filter units 14 are primed with filtrate fluid, such as clean water or clean oil. The air trapped in the conduit and filter units 14 is released through the air release means 150 and 152 provided on the top portion of the filter panel 14. After priming the tank 12 and the filter units 14, such that the filter units 14 are completelty submerged, the filtration apparatus is prepared for operation.

In operation, the motor-driven suction pump 20 and-/or 22 draws fluid from its associated conduit manifold and filter units 14. The filtrate is discharged through the associated discharge conduit and a portion of the flow is diverted into the cleaning system header 140. The cleaning system header 140 delivers the portion of filtrate flow to the dispersing conduits 144, where the filtrate flow is directed vertically downward through the openings 146 in the dispersing conduit 144 across the particulate-filtering surface of the filter medium 94 to flush the particulates vertically downward towards the solids collection section 82 of the tank 12. Preferably, the filter leaf cleaning jet system is operated continuously during the filtration of polluted liquid through the filter units 14. This continuous flushing of particulates from the surface of the filter medium 94 has been found to greatly increase the length of time the filter units 14 can be operated without adverse build-up and fouling of the filter medium 94. The filter leaf cleaning jet system can also be used to provide an aerobic environment inside the tank 12 by positioning the jet openings 146 above the normal liquidd level in the tank 12. The high velocity filtrate flow through the openings 146 entrains air below the surface of the polluted liquid, providing a high degree of aeration.

Figure 9:
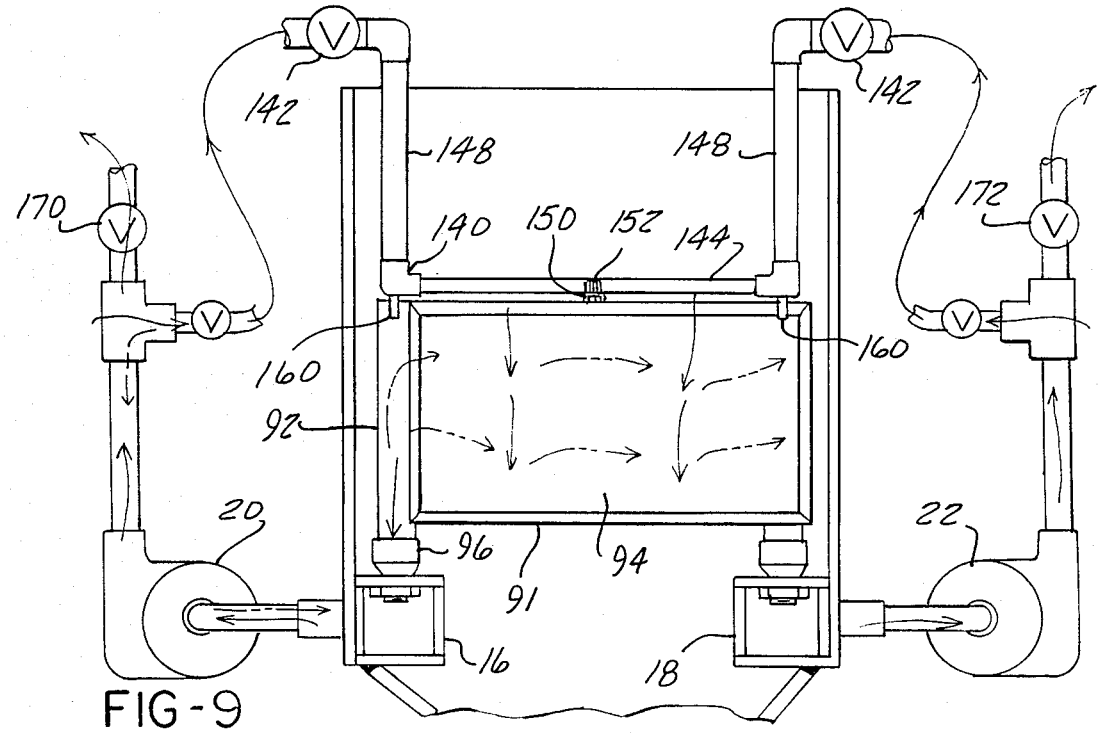
FIG. 9 is a schematic view showing normal flow of filtrate and reversed flow of filtrate to slightly pressurize the vacuum filters for backwash cleaning.

In the event that the openings in the filter membrane do become fouled or clogged, causing an increase in the vacuum drawn by the filtrate pump for the desired flow, the filter leaves or units 14 can be backwashed by turning off one of the two pumps 20 or 22 and closing the discharge header valve 170 or 172 for that pump as illustrated in FIG. 9. Because of the unique arrangement of the filter leaves 14, that is, positioned in staggered, adjacent, abutting and lateral relationship with two separate discharge manifolds 16 and 18, this allows the filtrate flow to reverse itself (shown in phantom lines in FIG. 9 with pump 20 off and valve 170 closed) through the shut-off pump, 20 or 22, passing through the associated filtrate manifold, 16 or 18, into the connected filter leaves 14 to slightly pressurize the interior of the filter leaves. The filtrate flow from the pump remaining in service provides a slight pressure and filtrate flow into the out-of-service filter leaves 14 clearing the openings in the filtrate membrane 94. In addition, the filtrate membrane 94 will be pushed out slightly, due to the slight positive pressure on the interior of the filter leaf 14, into the stream of the cleaning jet flow (shown in solid lines in FIG. 9) to flush particulates from the surface of the filter membrane 94, which will then be carried downward across the surface of the filter membrane 94 towards the lower solids collection portion of the tank 12.

Figure 11:
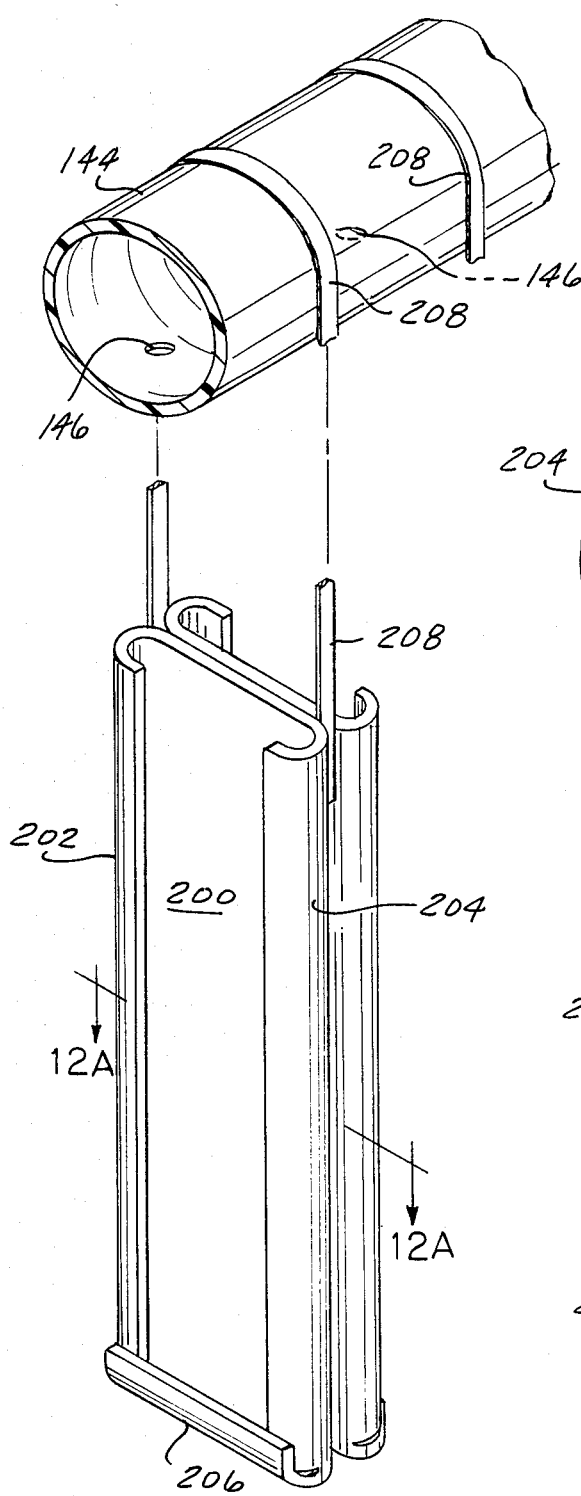
FIG. 11 is a perspective view of a membrane wiping member supported from a dispersing conduit.

FIG. 11 is a perspective view showing another means for rehibilitating the filter membrane 94, in addition to or as an alternative to the means for flusing down the membrane 94 previously discussed above. The filter membrane rehibilitating means can include means for wiping particulates from the membrane 94 and means for oscillating the wiping means across the membrane 94. The wiping means is disposed in contact with the membrane 94; preferably the wiping means extends along the full vertical length of the filter panel 90 and is disposed within the narrow passage 124 formed between two adjacent filter panels 90, such that the wiping means is in contact with opposing membranes 94 sealingly mounted on the adjacent filter panels 90. The wiping means can include a wiping member 200 disposed generally perpendicular to the membrane surface with opposing edges 202 and 204 extending along an entire vertical length of the membrane 94. The wiping member 200 is suspended from a support for oscillating movement with respect to the filter panel 90.

In the case of using the wiping member 200 in conjunction with the means for flushing, the wiping member 200 can be suspended from the dispersing conduit 144 by an appropriate attachment means 208, such as Velcro strips secured to the wiping member 200. The wiping member 200 can be made from cotton terry cloth, chamois, leather or other comparable material and suspended equidistantly between the jets 146 in the dispersing conduit 144. The wiping member 200 is slightly greater than the width of the narrow passage 124 so that simultaneous wiping of opposing membranes 94 can be accomplished. The means for oscillating the wiping member 200 can include mechanical oscillation, hydraulic oscillation or magnetic oscillation. For example, hydraulic oscillating means can be provided by forming curved edges 202 and 204 on the wiping member 200, such that the curved edge turns the filtrate flow at least parallel to the plane of the membrane 94, while an additional curved edge 206 keeps the fabric strip wiping member 200 in a fully extended position. The curved edges 202, 204 and 206 interact with the filtrate flow from the jets 146, causing small eddies of flow in the narrow passage 124 to gently oscillate the wiping member 200 across the surface of the membrane 94. If required, an optional rod or stiffening member 210 can be provided within the wiping member 200; see FIGS. 12B and 12D. The optional rod or stiffening member 210 stiffens the vertical length of the wiping member to transmit oscillating wiping action along the entire length of the fabric strip wiping member 200. Alternatively, small weights may be provided at the bottom end of the wiping member 200 to assure that the wiping member 200 remains fully extended. To enhance the hydraulic oscillating means, the filtrate fluid flow through the dispersing conduits 144 may be pulsated into the narrow passageway 124 between the filter panels by means which are considered to be well known in the art.

For example, it should be apparent that the pulsated filtrate flow through the jets 146 could be used separately of the wiping means to impart a throbbing effect on the membrane 94 to promote the release of residue from the flexible membrane 94. In the case of mechanical oscillation means, the wiping members 200 can be suspended from an appropriate support member (not shown) which is mechanically oscillated by means well known in the art, such as a solenoid, or a cam and cam follower assembly. It should also be apparent to those skilled in the art that the rehibilitating means described herein can be operated continuously while the filters are in operation or, in the alternative, can be operated intermittently based on a selected time sequence, or based on the suction pressure drawn by the filtrate pumps, or other known triggering mechanisms appropriate in the particular filtering application.

Figure 12A:
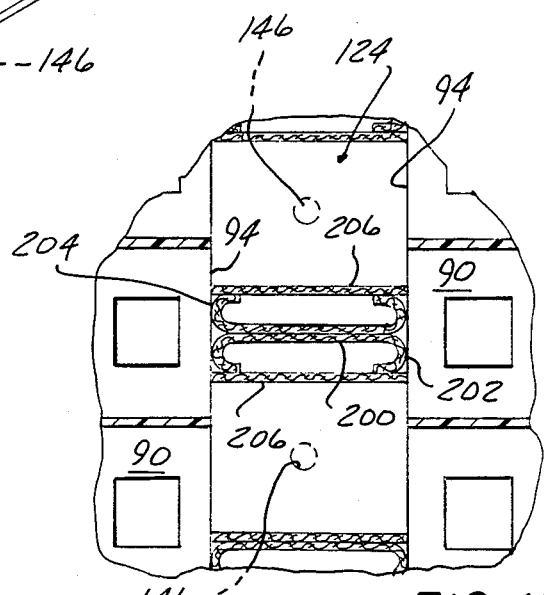
FIGS. 12 A–D are top views showing different configurations for the wiping member.
Figure 12B:
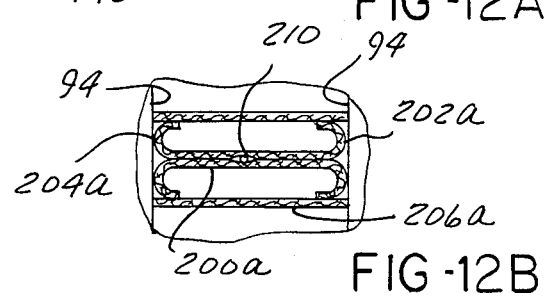
Figure 12C:
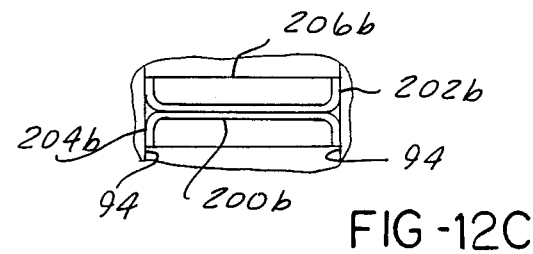
Figure 12D:
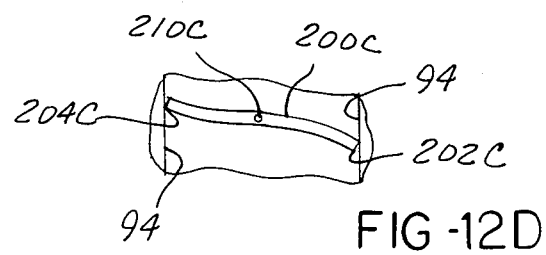

FIGS. 12A through 12D disclose various configurations of the wiping member 200 which are considered to be within the scope of the invention disclosed herein. FIG. 12A is a cross-sectional top view of the wiping member 200 taken as shown in FIG. 11. A plurality of wiping members 200 are spaced along each dispersing conduit 144, with each wiping member 200 disposed midway between adjacent jet openings 146 (shown in phantom). A vertical edge 202 or 204 of the flexible wiping member 200 brushes or engages with the membrane 94, such that movement of the wiping member 200 gently sweeps or brushes particulates across the membrane surface 94. The wiping member 200 has a curved portion adjacent the membrane 94 for directing filtrate flow along a path preferably at least parallel with the membrane surface 94 to prevent short circuiting of the filtrate flow directly through the membrane into the filter panel 90. This configuration, as shown in FIG. 12C, has wiping member 200b having vertical edge portions 202b or 204b which curve from the middle portion of the wiping member 200b, which is generally perpendicular to the membrane surface 94, to a direction roughly parallel to the membrane surface 94 at the outermost edge of the wiping member 200b. In addition, the curvature of the lower end portion of the wiping member 200b can be disposed at approximately a 90° angle, as shown in FIG. 12C, to prevent excessive filtrate flow below the lower edge of the filter panels 90 which would cause undesirable turbulent flow in the solids collection section of the tank 12. The exaggerated curvature of the wiping member 200 and 200a shown in FIGS. 12A and 12B create currents surrounding the wiping member, thereby imparting motion to the wiping member from the filtrate flow. The currents enhance the flushing of particulates and residue from the membrane 94, while the oscillating motion of the wiping members gently brushes residue from the membrane 94 to generate increased amounts of sediment suspended in the narrow passageway 124 which gradually make their way to the solids collecting portion of the tank 12. The fresh surface provided by the flushing and wiping action rehibilitates the filter membrane 94, thereby maintaining an acceptable suction pressure limit on the filtrate pumps to prevent undesirable cavitation within the pump housing. In its simplest form, the wiping member 200c, as shown in FIG. 12D, is a strip of flexible material slightly wider than the width of the narrow passage 124 so that opposite vertical edges 202c and 204c engage with opposing membranes 94 of adjacent filter panels 90. An optional rod or stiffening member 210c may be included to stiffen the vertical length of the wiping member 200c so that oscillating motion is transmitted along the entire vertical length of the wiping member. The wiping member 200c is envisioned for use in systems not employing the filtrate flow for flushing particulates from the surface of the membrane 94. Therefore, the wiping member 200c would be connected to oscillating support member. The horizontal oscillation of the support member is provided by means well known to those skilled in the art, such as a rotary-driven disk having a protruding member along an axis parallel to a drive shaft for the disk. The protruding member travels within a slot of an armature pivotally secured at one end and connected to the wiping member support at the other end for transferring oscillating motion from the driven disk to the support member.

In summary, the invention described herein discloses a unique method for separating immiscible liquids and/or particulates from liquids at a very high rate of flow. This filter uses a centrifugal pump supplying vacuum to a membrane, generally with sub-micron pores, stretched over a rectangular grid of evenly spaced, parallel, horizontal and vertical bars that are inwardly, vertically and horizontally slotted so as to give even flow throughout the membrane. The membrane is secured to the filter element, without adhesive, sewing or screws by placing it over a slotted frame and pushing a gasket against the membrane's perimeter to push it into the slots surrounding the filter element to provide a leak-proof, semi-permanent assembly that can be easily assembled or disassembled without tools. The system maintains a steady flow at a very low pressure and divides the filtrate into two streams, one to the cross-flow membrane cleaning device, and the other to the filtrate reservoir. At the same time, the solute concentration is kept from increasing by a continuous drain from the bottom of the filter vessel. The dramatic flow at very low pressure, a few inches of mercury, is the result of reducing the flow through a 0.8 micron membrane capable of about 30 gallons per minute per square foot of filter area to about three gallon per minute per square foot of filter area and with a substantial amount of this flow being filtered water from the cross-flow stream. The resulting pressure is too low to attract and hold a particle caught in the jet stream that is moving rapidly downward over the sub-micron membrane surface to below the filtering area. The unique filter arrangement allows half of the filter leaves to be shut down; and while a slight pressure is exerted on the inside of the filter leaves, it is vigorously washed down with filtered water provided by the other half of the filter leaves left in service. A membrane wiping assembly can be used in addition to the cross-flow membrane cleaning device or, as an alternative, to the cross-flow device. The membrane wiping assembly uses flexible strips of fabric or the like suspended vertically to contact the filter membrane, and oscillated horizontally along a path generally parallel to the plane of the filter membrane to gently brush residue and particulates from the membrane surface, providing a fresh, rehibilitated filter surface.

The invention can be used for separating a mixture of water and oil by first starting or priming the filter with clean water. When the membrane is wet with water, oil will not pass through it. The oil overflows a weir (not shown) to leave the system. When the membrane is wet with oil during start-up or priming, water will not pass through it. Of course, the filter area and the viscosity of the fluid would determine the vacuum required to obtain the desired flow. The water will overflow a weir (not shown) to leave the system.

As will be readily recognized by those skilled in the art after reading the description of this invention, there are unlimited uses for this filter. For example, because the present invention provides two separate, independent sets of filter leaves, manifolds and filter pumps, it is possible to provide different filtering characteristics for each set of filter leaves. Of course in this example, separate discharge headers could be provided for each filtrate pump.

Having disclosed certain preferred embodiments of the invention for purposes of explanation, further modifications or variations thereof, after study of this specification, will or may occur or become apparent to persons skilled in the art to which the invention pertains. Reference should be made to the appended claims in determining the scope of the invention.

What is claimed is:

1. A suction-type filtration apparatus comprising:
   a unitary chamber having a first open section, a second intermediate, removable filter-panel-retaining section, and a third solids collection section in free and open communication and connection with each other;
   a set of first filter panels retained in the second intermediate section of the chamber for collecting, conducting and discharging liquid filtrate;
   a first removable filtrate receiving manifold in fluid communication with the set of first filter panels and disposed below said first filter panels in said second intermediate section of said chamber;
   a set of second filter panels retained in the second intermediate section of the chamber for collecting, conducting and discharging liquid filtrate, said set of second filter panels interposed in staggered, adjacent, abutting, lateral relationship with said set of first filter panels forming a narrow passageway between filtering membrane surfaces of adjacent first and second filter panels;
   a second removable filtrate receiving manifold, separate and independent of said first manifold, in fluid communication with the set of second filter panels and disposed below said second filter panels in said second intermediate section of the chamber;
   a set of first filter membranes releasably connected to said set jof first filter panels with a fluidtight seal between said first membranes and said first filter panels;
   a set of second filter membranes releasably connected to said set of second filter panels with a fluidtight seal between said second membranes and said second filter panels;
   a first filtrate pump in fluid communication with said removable first manifold for drawing filtrate from said set of first filter panels;
   a second filtrate pump in fluid communication with said removable second manifold for drawing filtrate from said set of second filter panels;
   a first filtrate header for receiving discharged filtrate from said first filtrate pump;
   a second filtrate header for receiving discharged filtrate from said second filtrate pump; and
   means for rehabilitating the first and second filter membranes.

2. The apparatus of claim 1, wherein the rehabilitating means comprises;
   a cleaning system header connected to one of the filtrate headers for diverting a portion of filtrate flow into the cleaning system header;
   valve means for controlling filtrate flow into the cleaning system header; and
   a submerged dispersing conduit connected to the cleaning system header and spaced vertically above the narrow passageway between adjacent first and second filter panels, said dispersing conduit having an opening for directing a diffusing spray of filtrate flow generally vertically downward across the set of first and second filter membranes to flush particulates across the first and second filter membranes toward the solids collecting section of the chamber.

3. The apparatus of claim 1, further comprising means for backwashing one of the sets of filter panels while the remaining set of filter panels continues to operate.

4. The apparatus of claim 3, wherein the means for backwashing comprises:
   a cleaning system header connected between the first and second filtrate headers for diverting a portion of the filtrate flow into the cleaning system header;
   valve means for controlling filtrate flow into the cleaning system header;
   submerged dispersing conduits connected to the cleaning system header disposed spaced vertically above the narrow passageway between the first and second filter panels, the dispersing conduits including openings for directing a diffusing spray of filtrate flow across the set of first and second filter membranes to flush particulates toward the solids collecting section of the tank, wherein one of the filtrate pumps is shut off allowing filtrate flow to reverse through the shut-off pump to slightly pressurize one of the sets of filter panels causing the corresponding set of filter membranes to be backwashed and to slightly bulge outward into the narrow passageway where particulates are flushed across the set of filter membrane by filtrate supplied from the operating filtrate pump.

5. The apparatus of claim 1, wherein said sets of first and second filter membranes have sub-micron pores capable of flowing at least 30 gallons per minute per square foot of filter area.

6. The apparatus of claim 1, further comprising:
   a pontoon platform for supporting said unitary chamber submersed at a fixed level in a large body of fluid such that the fluid flows into the first open section by gravity.

7. The apparatus of claim 1, further comprising:
   a first removable assembly including said set of first filter panels, said first removable filtrate receiving manifold and said set of first filter membranes; and
   a second removable assembly including said set of second filter panels, said second removable filtrate receiving manifold and said set of second filter membranes.

8. The apparatus of claim 1, wherein the rehabilitating means comprises:
   a membrane wiping member disposed generally perpendicular to the membrane surfaces with an edge portion contacting a corresponding membrane for sweeping movement across the membrane to brush particulates from the membranes; and
   means for oscillating the membrane wiping member along a path generally parallel to the membranes.

9. The apparatus of claim 1, wherein the rehabilitating means comprises:
   a cleaning system header connected between the first and second filtrate header for diverting a portion of the filtrate flow into the cleaning system header;
   valve means for controlling filtrate flow into the cleaning system header;
   submerged dispersing conduits connected to the cleaning system header disposed vertically spaced above the narrow passageway between the first and second filter panels, the dispersing conduits including openings for directing a diffusing spray of filtrate flow across the first and second filter membranes to flush particulates toward the solids collecting section of the tank;

means for aligning the dispersing conduits vertically above the narrow passageway between the first and second filter panels; and membrane wiping members supported from the dispersing conduits and disposed generally perpendicular to opposing first and second membranes with opposite edge portions of each membrane wiping member contacting one of the membranes for sweeping movement across the membrane to brush particulates from the membrane, each membrane wiping member having a curver portion adjacent each membrane for directing filtrate flow at least parallel with each membrane and for oscillating the membrane wiping member within the narrow passageway by creating currents surrounding the membrane wiping members, thereby imparting motion to the membrane wiping members from the filtrate flow.

10. A suction-type filter apparatus comprising:

a generally vertical, unitary chamber having an upper open section, an intermediate filter-panel-retaining section, and a lower solids collection section in free and open communication and connection with each other;

first and second filtrate receiving manifolds disposed in the intermediate filter-panel-retaining section of the chamber, the second manifoldd separate and independent of the first manifold:

first and second sets of filter panels supported on top of and in fluid communication with the first and second manifolds respectively, such that the first and second sets of filter panels are interposed in staggered adjacent abutting lateral relationship forming a narrow passageway between vertically disposed particulate-filtering membrane surfaces of adjacent first and second filter panels, wherein one of the first and second sets of filter panels is operable independently and separately from the other set of filter panels:

filtrate pump means having a suction inlet and a pressurized discharge outlet, the suction inlet communicating with the filter panels selectively through the first and second manifolds for receiving liquid filtrate while applying vacuum pressure to selected filter panels;

a filtrate header connected to the pressurized discharge outlet of the filtrate pump means; and means, disposed in the intermediate section, spaced vertically above and between adjacent first and second filter panels for continuously cross-flow cleaning the membrane surfaces with pressurized filtrate flow directed generally vertically downward through the narrow passageway to flush particulates from the particulate-filtering membrane surfaces of the filter panels toward the solids-collecting section of the tank while filtering.

11. The apparatus of claim 10, wherein said crossflow cleaning means comprises:

a cleaning system header connected to the filtrate header for diverting a portion of filtrate flow into the cleaning system header;

valve means for controlling filtrate flow into the cleaning system header; and a dispersing conduit connected to the cleaning system header spaced vertically above and in between the membrane surfaces of adjacent filter panels and having an opening for directing filtrate flow generally vertically downward across the particulate-filtering membrane surfaces of adjacent filter panels to flush particulates from the particulate-filtering membrane surfaces towards the solids-collecting section of the tank.

12. The apparatus of claim 11, further comprising means for aligning the dispersing conduit vertically above and horizontally in between particulate-filtering membrane surfaces of adjacent filter panels.

13. The apparatus of claim 11, further comprising:

said dispersing conduit having a plurality of small openings spaced on about one-half inch centers along a longitudinal length of the dispersing conduit, each of said openings having an angle of discharge offset from a vertical axis, such that the angles of discharge for adjacent openings are disposed in opposite rotational directions from the vertical axis; and means for pulsating the filtrate flow through the dispersing conduit to impart a throbbing effect on the membrane surface.

14. The apparatus of claim 10, further comprising each filter panel having air release means for discharging air from the filter panel while priming the filter panel with clean fluid during start-up.

15. The apparatus of claim 10, further comprising means for backwashing the membrane surface of each filter panel.

16. The apparatus of claim 10, wherein said wiping means comprises:

a membrane wiping member supported from said cross-flow cleaning means and disposed generally perpendicular to said particulate-filtering membrane surfaces with an edge portion contacting said particulate-filtering membrane surfaces for sweeping movement across said surfaces to softly brush particulates from said surfaces; and means for oscillating said wiping member along a path generally parallel to said particulate-filtering surfaces.

17. The apparatus of claim 16, wherein said oscillating means comprises:

curved surfaces formed on the membrane wiping member for interaction with the cross-flow cleaning means to impart oscillatory motion to the membrane wiping member.

18. The apparatus of claim 16, further comprising:

said membrane wiping member having a curved portion adjacent the membrane surfaces for directing filtrate flow along a path at least parallel with the membrane surfaces to reduce short circuiting of filtrate flow through the membrane surfaces into the filter panels.

19. The apparatus of claim 10, further comprising:

means for releasably sealing the particulate-filtering membrane surfaces to the filter panels.

20. The apparatus of claim 19, wherein said releasable sealing means comprises:

an extrusion connected to the filter panels and having a peripheral slot formed on opposite edges of the extrusion such that two filtering surfaces are formed on opposite sides of the filter panels; and a gasket engageable within the peripheral slot formed in the extrusion with the particulate-filtering membrane surfaces interposed between the gasket and the peripheral slot.

21. The apparatus of claim 10, further comprising:

means for wiping particulates from the particulate-filtering membrane surfaces, said wiping means disposed for sweeping movement with respect to the particulate-filtering membrane surfaces.

22. A suction-type filter apparatus comprising:

a unitary chamber having a first open section, a second filter-panel-retaining section, and a third solids collection section in free and open communication and connection with each other;

first and second removable filtrate-receiving manifold means disposed in the second section of the chamber, the second manifold means separate and independent of the first manifold means;

first and second filtrate panel means supported on top of and in fluid communication with the first and second manifold means respectively, such that the first and second filter panel means are interposed in staggered, adjacent, abutting lateral relationship forming a narrow passageway between vertically disposed particulate-filtering membrane surface means of adjacent first and second panel means, wherein one of the first and second filter panel means is selectively operable independently and separately from the other filter panel means and each manifold means and associated filter panel means forms a removable assembly;

filtrate pump means having a suction inlet and a pressurized discharge outlet, the suction inlet selectively in fluid communication with said first and second filter panel means through said first and second manifold means respectively for receiving liquid filtrate while applying vacuum pressure to a selected filter panel means :

pressurized filtrate cross flow means for continuously cleaning the filter panel means with pressurized filtrate flow directed generally vertically downward through the narrow passage way between vertically disposed particulate-filtering membrane surface means of adjacent first and second panel means to continuously flush particulates from the membrane surface means toward the third solids collection section of the chamber while filtering.

23. The suction-type filter apparatus of claim 22, further comprising:

means for backwashing one of the filter panel means while the other filter panel means continues to operate.

* * * * *